US010415291B2

(12) United States Patent
Sauer et al.

(10) Patent No.: US 10,415,291 B2
(45) Date of Patent: Sep. 17, 2019

(54) SHADING DEVICE FOR A WINDOW OF AN AUTOMOTIVE VEHICLE

(71) Applicant: BOS GMBH & CO. KG, Ostfildern (DE)

(72) Inventors: Roman Sauer, Grossbettlingen (DE); Sandor Koller, Gyoer (HU)

(73) Assignee: BOS GMBH & CO. KG, Ostfildern (DE)

(*) Notice: Subject to any disclaimer, the term of this patent is extended or adjusted under 35 U.S.C. 154(b) by 221 days.

(21) Appl. No.: 15/522,478

(22) PCT Filed: Oct. 13, 2015

(86) PCT No.: PCT/EP2015/073690
§ 371 (c)(1),
(2) Date: Apr. 27, 2017

(87) PCT Pub. No.: WO2016/066421
PCT Pub. Date: May 6, 2016

(65) Prior Publication Data
US 2017/0314309 A1  Nov. 2, 2017

(30) Foreign Application Priority Data
Oct. 29, 2014  (DE) .................. 10 2014 222 128

(51) Int. Cl.
E05F 1/10  (2006.01)
B60J 1/20  (2006.01)

(52) U.S. Cl.
CPC ............ E05F 1/105 (2013.01); B60J 1/2022 (2013.01); B60J 1/2038 (2013.01); B60J 1/2063 (2013.01); B60J 1/2086 (2013.01); B60J 1/2091 (2013.01)

(58) Field of Classification Search
CPC ........ E05F 1/105; B60J 1/2022; B60J 1/2063; B60J 1/2086; B60J 1/2091; B60J 1/20;
(Continued)

(56) References Cited

U.S. PATENT DOCUMENTS 6,086,133 A * 7/2000 Alonso ................. B60J 1/2019
160/23.1
7,089,992 B2 * 8/2006 Walter .................. B60J 1/2027
160/370.22
(Continued)

FOREIGN PATENT DOCUMENTS

CN       101987059 A       3/2011
DE   10 2008 045 053 A1   3/2009
(Continued)

OTHER PUBLICATIONS

International Search Report issued in Application No. PCT/EP2015/073690 with English translation, dated Jan. 29, 2016 (5 pages).
(Continued)

Primary Examiner — Beth A Stephan
(74) Attorney, Agent, or Firm — Flynn Thiel, P.C.

(57) ABSTRACT

A shading device including a shading structure displaceable in vehicle-fixed lateral guiding rails between a lowered rest position and a deployed shading position using a drive arrangement. The shading structure in the rest position is lowered down in a vehicle-fixed chamber through a passage, wherein the passage is closable by a cover movable between an open position and a closed position, and a control arrangement for opening and closing the cover is provided and coupled to a displacement movement of the shading structure. The control arrangement includes a control plunger engaging on the cover, which plunger is articulated to the cover in opposed pull and push directions. The control plunger is in operative connection with the cover via a tensioning arrangement which is spring-elastically tensioned
(Continued)

in one movement direction and inactively relaxed in an opposite movement direction.

8 Claims, 7 Drawing Sheets

(58) Field of Classification Search
CPC ...... B60J 1/2033; B60J 1/2013; B60J 1/2038; B60J 1/2066
See application file for complete search history.

(56) References Cited

U.S. PATENT DOCUMENTS

| | | | | |
|---|---|---|---|---|
| 8,215,697 B1* | 7/2012 | Lin | .................. | B60J 1/2027 160/23.1 |
| 2004/0144506 A1 | 7/2004 | Walter et al. | | |
| 2011/0036515 A1* | 2/2011 | Lin | .................. | B60J 1/2019 160/238 |
| 2017/0210208 A1* | 7/2017 | Zhang | .................. | B60J 3/02 |
| 2018/0178634 A1* | 6/2018 | Sauer | .................. | B60J 1/2038 |

FOREIGN PATENT DOCUMENTS

| | | |
|---|---|---|
| DE | 10 2012 019 903 A1 | 5/2013 |
| EP | 1 418 073 A1 | 5/2004 |
| EP | 2 614 974 A2 | 7/2013 |

OTHER PUBLICATIONS

Written Opinion of International Searching Authority issued in Application No. PCT/EP2015/073690 dated Jan. 29, 2016 (5 pages).
Search Report of German Patent Office issued in Application No. 10 2014 222 128.5 dated Jul. 7, 2015 (4 pages).
Chinese Office Action issued in Appln. No. 201580059106.1 dated Dec. 7, 2018 (6 pages).

* cited by examiner

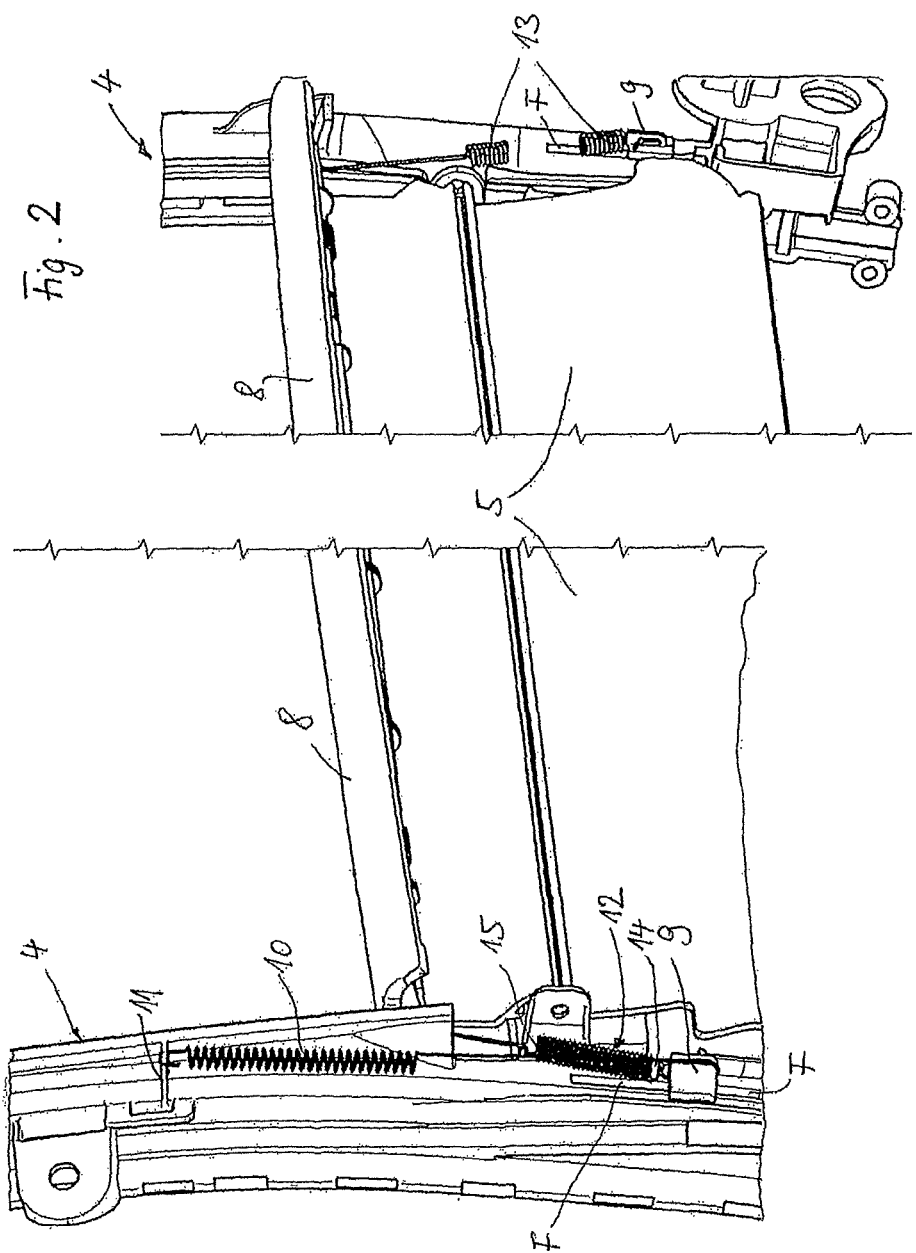

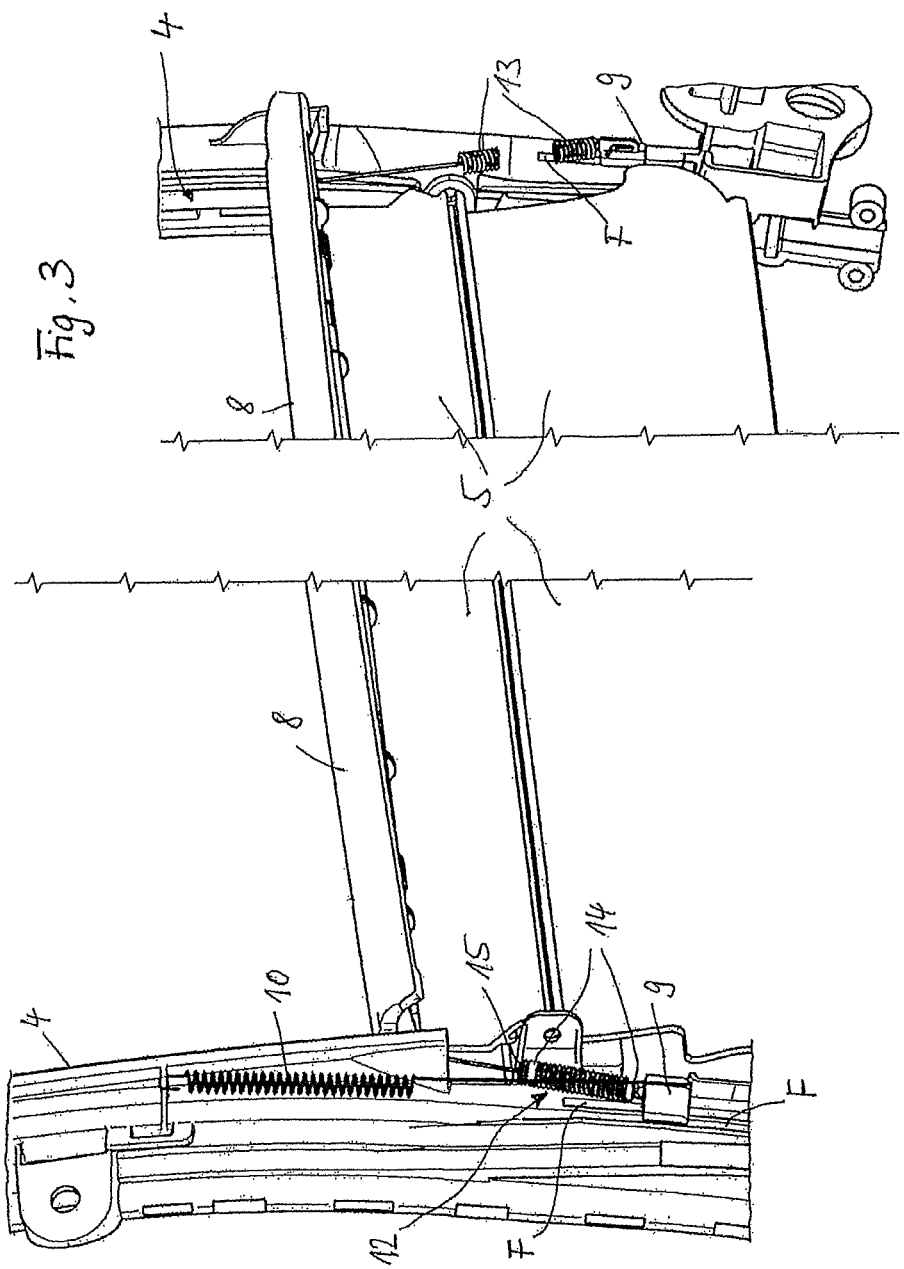

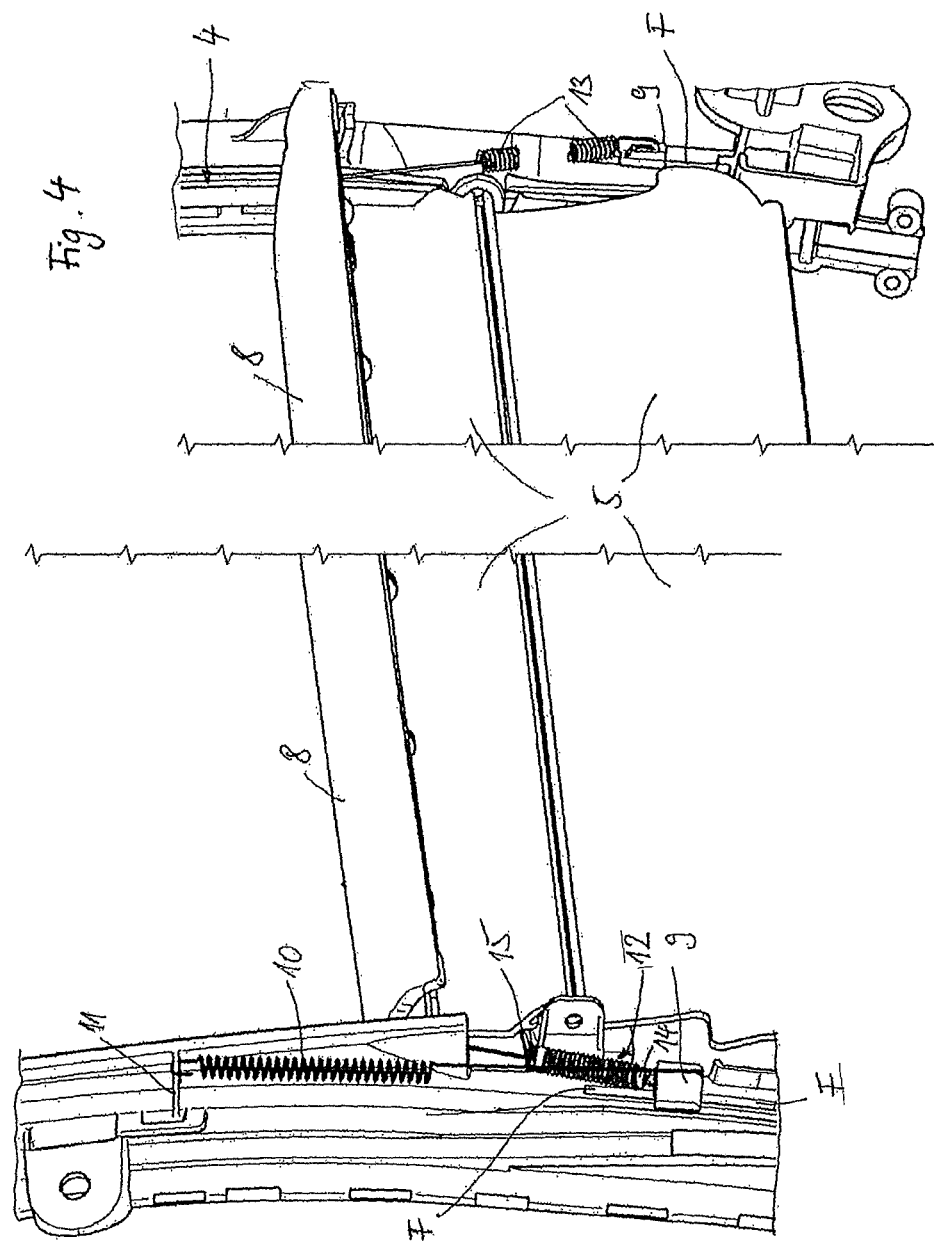

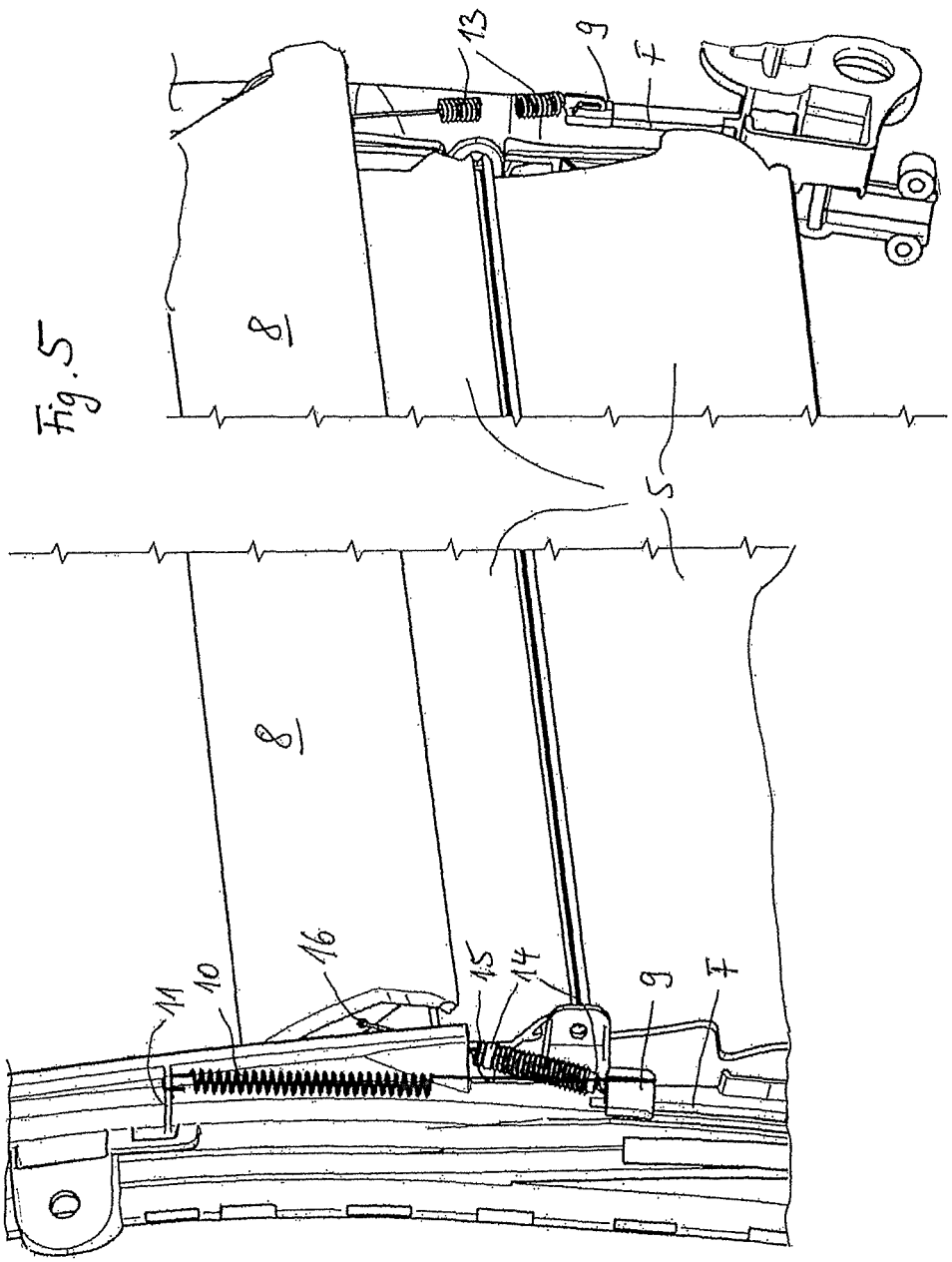

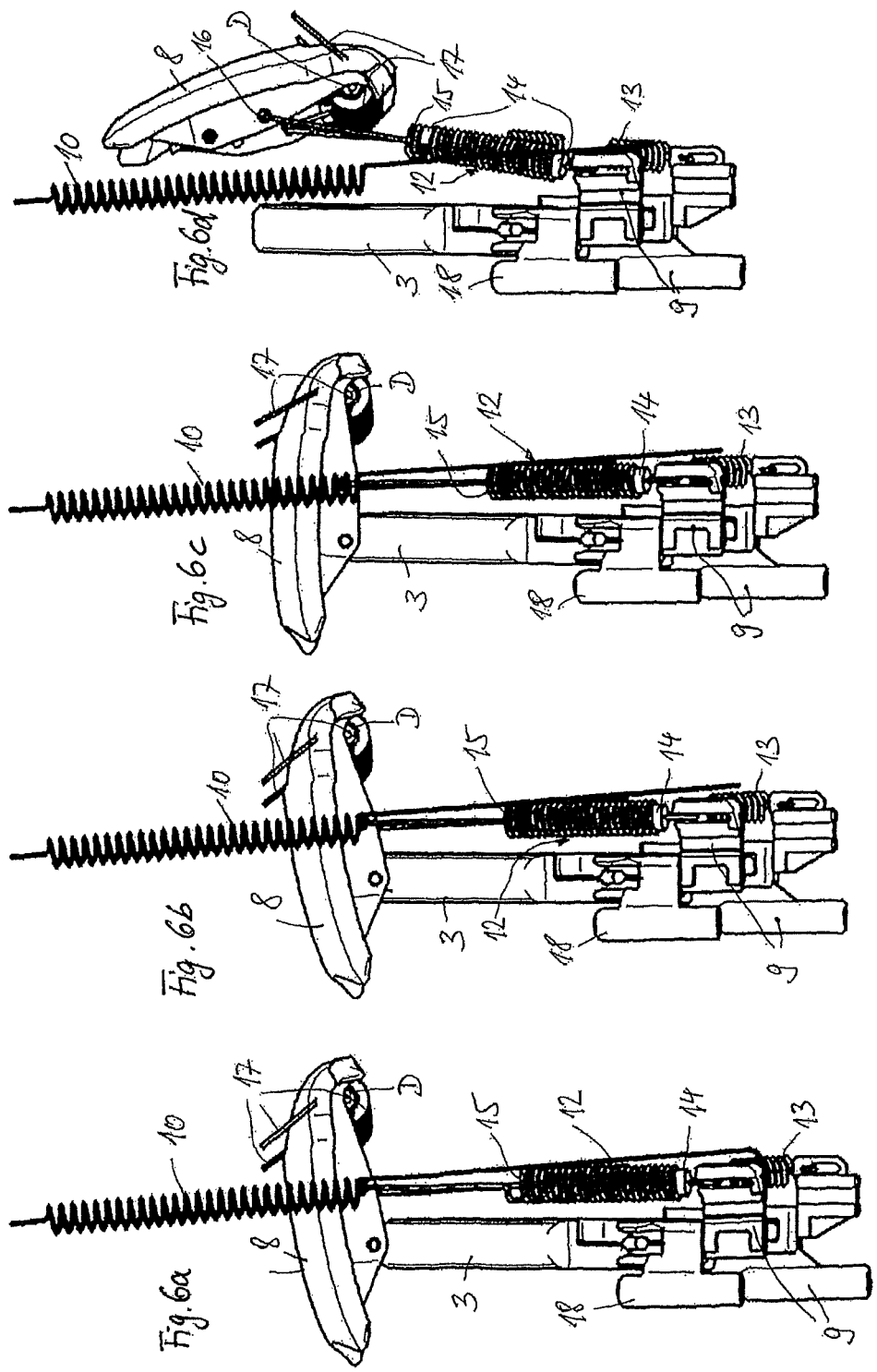

SHADING DEVICE FOR A WINDOW OF AN AUTOMOTIVE VEHICLE

TECHNICAL FIELD

The invention relates to a shading device for a window of an automotive vehicle, comprising a shading structure which is displaceable in vehicle-fixed lateral guiding rails between a lowered rest position and a deployed shading position using drive means, wherein the shading structure in the rest position is lowered down in a vehicle-fixed chamber through a passage, wherein the passage is closable by a cover which is movable between an open position and a closed position, and wherein control means for opening and closing the cover are provided and coupled to a displacement move of the shading structure.

BACKGROUND AND SUMMARY

Such a shading device is generally well-known. The known shading device is intended for a side window of a passenger vehicle. For shading the side window a flexible shading structure is provided and mounted on a winding shaft for winding up and off. The winding shaft is rotatably mounted on the vehicle below a vehicle lateral belt line behind a vehicle interior lining. The shading structure includes a dimensionally stable pull-out profile on a face end region that is in front in the pull-out direction, which profile is displaceable in vehicle-fixed lateral guiding rails between a rest position, concealed by the interior lining, and a shading position, moved up to an upper edge of the side window. The shading structure and the pull-out profile are led through a passage with the vehicle interior lining, which passage is closed by a cover in the lowered rest position. The cover is pivotable between an open position and a closed position, wherein pivoting of the cover is controlled by control means operable to open or close the cover as a function of the displaced position of the pull-out profile of the shading structure.

An object of the invention is to provide a shading device of the above mentioned type which allows secure and rattle-free transferring and securing of the cover in relation to the open and closed position thereof.

This object is achieved in that the control means comprise a control plunger engaging on the cover, which plunger is articulated to the cover in opposed pull and push directions, wherein the control plunger is in operative connection with the cover via a spring-elastic tensioning means which is spring-elastically tensioned in one movement direction and inactively relaxed in an opposite movement direction. According to the invention, the control plunger has a dual function in that, firstly, it operates to carry out force transmission to the cover in the manner of a plunger rod, in order to pivot said cover to its open position or its closed position. Secondly, the control plunger is associated with a spring-elastic tensioning means which exerts an additional elastic tensional force on the cover in a movement direction of the control plunger. Advantageously, the elastic tensional force is provided in the closing direction or towards the closed position of the cover, in order to tension said cover securely and rattle-free towards its closed position and, thus, to secure it in said closed position. An elastomer string or even a mechanical spring arrangement, like in particular a spiral tension spring or a spiral compression spring, can be provided as a spring-elastic tensioning means. Advantageously, the spring-elastic tensioning means comes into action during a tensile load of the control plunger. In a variant of the invention, the spring-elastic tensioning means can also be effective in case of a compressive load of the control plunger. Advantageously, merely one single control plunger with an associated spring-elastic tensioning means is provided to engage on the cover. A corresponding point of application can be provided in the region of a side flank of the cover or in the region of a cover center. In case the cover has a relatively great length, however, merely a small width, due to a relatively long but narrow passage in the belt line region of a corresponding interior lining, the cover is preferably reinforced along its longitudinal direction such that upon engagement of the control plunger in connection with the spring-elastic tensioning means in the region of a side flank of the cover, there is no significant torsion of the cover produced so that the tensional force acting on the cover, which is introduced in the region of a side flank, tensions the cover over its entire length towards the end position. The solution according to the invention is with particular advantage adapted to the use with side windows of passenger vehicles. Indeed, the solution according to the invention can also be used in the region of rear windows of passenger vehicles or on vehicle windows of other automotive vehicles operated on the road, in rough terrain or on rails. Therefore, the solution according to the invention is utile not only for passenger vehicles, but also for commercial vehicles and trucks as well as railway vehicles.

In an embodiment of the invention, the control plunger and the tensioning means are formed by a spiral tension spring which includes at least one terminal spring winding acting as a tensioning means in the pull direction, wherein all spring windings of the spiral tension spring are compressed to block in the push direction. This is an embodiment of the invention that is particularly simple and cost-efficient to produce. Once the spring windings of the spiral tension spring are compressed to block, the spiral tension spring acts as a plunger rod in the push direction. In the pull direction, preferably the large part of the spring windings are likewise spring-elastically blocked, in order not to impair the effect as a plunger rod in the pull direction. However, one or more terminal spring windings maintain their spring-elastically, in order to allow development of the desired spring-elastic tensioning effect in the pull direction. The wording that the spring windings are compressed to block does not necessarily mean that the spring windings contact on block. The wording merely means that the spring windings are blocked in their spring-elastic effect. In this functionality, the spiral tension spring acts rather as an at least essentially rigid plunger rod.

In a further embodiment of the invention, a spring wire of the spiral tension spring exhibits a spring rigidity great enough to exert a rigid plunger function on the cover in the push direction. This applies in particular to the free ends of the spiral tension spring which are articulated to the cover and a guiding element, respectively. The free ends need to have a rigidity such that under corresponding compressive or tensile loads, acting on the spiral tension spring, there is no bending or kinking occurring of the free ends that are not wound in spring windings.

In a further embodiment of the invention, the spiral tension spring is flanked on the exterior side and the interior side by a supporting body to clamp the spring windings in a force-fitting manner. The supporting body causes spring-elastic blocking of the spring windings and, furthermore, is configured such that in the pull direction one or more terminal spring windings are exposed in order to allow the desired supplementary elastic tensional force to be applied in the pull direction. The supporting body can be configured on the exterior side in the type of a sleeve encasing the spiral tension spring or on the interior side as a solid or hollow profile matched to the interior diameter of the spiral tension spring.

In a further embodiment of the invention, the supporting body is in the form of a cylindrical packing provided on the interior side. The packing has a dimensionally stable design and is preferably made of synthetic material in one piece.

In a further embodiment of the invention, the control plunger engages on one side of the cover, and an elastically tensionable pulling means engages on an opposite side of the cover, said pulling means acting on the cover only in the pull direction. The elastically tensionable pulling means can be an elastomer string or a spiral tension spring or a mechanical spring arrangement of similar design, and exert a tensional load on the cover in the closing direction. The elastically tensionable pulling means facilitates the closing function of the control plunger in the closing direction, in order to further reduce the risk of torsions acting on the cover. In the push direction of the control plunger, in order to transfer the cover into the open position, the elastically tensionable pulling means, held under permanent pre-tensioning, applies slight counteraction in order to allow clearance-free pivoting up of the cover, and in order to attenuate corresponding bearing tolerances of the cover.

In a further embodiment of the invention, the control plunger is articulated on a guiding element movable along a lateral guiding rail opposite to the point of application on the cover, which guiding element is in operative connection with the shading structure over a limited traveling distance.

In a further embodiment of the invention, the guiding element protrudes into a trajectory of a drive element of a dimensionally stable pull-out profile of the shading structure. Thus, a movement of the pull-out profile in the vicinity of its retracted rest position necessarily causes actuation of the guiding element, whereby by means of the control plunger—depending on the movement direction of the pull-out profile—a desired opening or closing of the cover is caused.

Further advantages and features of the invention will become apparent from the claims and from the description below of a preferred exemplary embodiment of the invention illustrated with reference to the drawings.

BRIEF DESCRIPTION OF THE DRAWINGS

FIG. 2 shows an enlarged illustration of a section of the shading device according to FIG. 1 in a closed position of a cover which closes or exposes an accommodation chamber for a shading structure;

FIG. 3 shows the illustration according to FIG. 2 in an early stage of a deployment procedure of the shading structure;

FIG. 4 shows the illustration according to FIGS. 2 and 3 in an intermediate position during the deployment procedure of the shading structure, where the cover is partially open;

FIG. 5 shows the illustration according to FIGS. 2 to 4 in an open position of the cover;

FIGS. 6a to 6d show a schematic side view of the various open positions of the cover in analogy to FIGS. 2 to 5.

DETAILED DESCRIPTION

Figure 1:
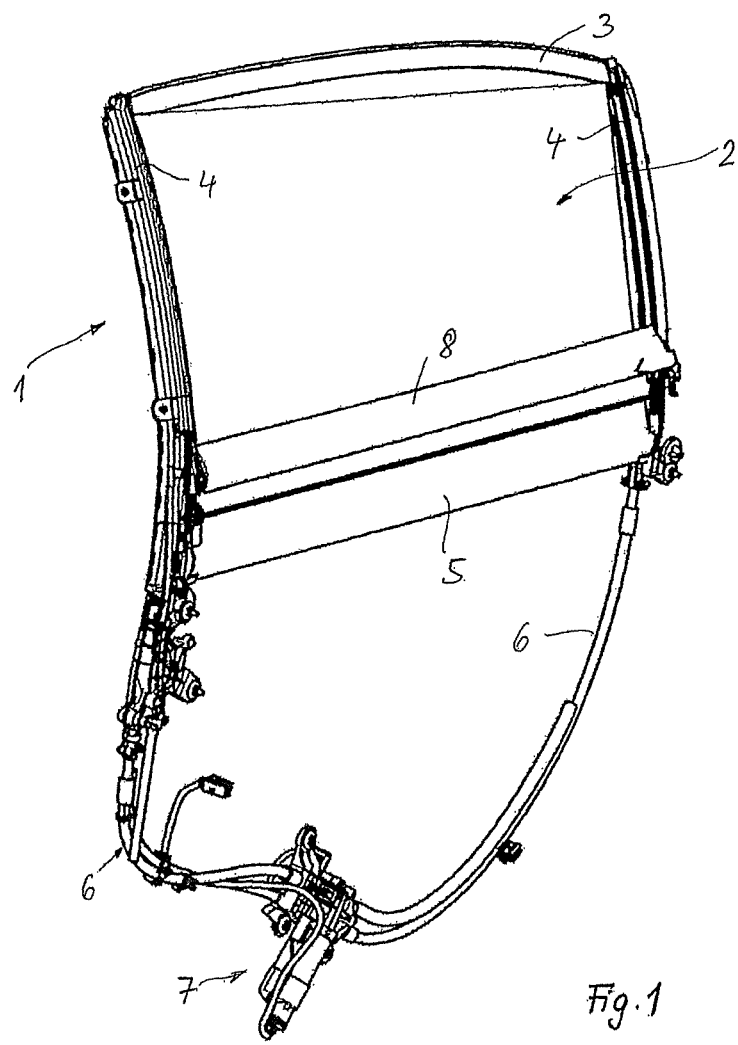
FIG. 1 shows an embodiment of a shading device according to the invention, intended for shading a side window of a passenger vehicle.

A shading device 1 according to FIG. 1 is intended for a side window of a rear side door of a passenger vehicle. The shading device 1 includes a shading structure 2 configured as a flexible sheet-like structure in the form of a textile woven or knitted fabric or in the form of a single-layer or multi-layer film sheet. The shading structure 2 has a low light transmission in order to effect darkening of the corresponding side window when in the shading position. The shading structure 2 is held on a rotating winding shaft for winding up and off in a manner not illustrated in more detail. The shading structure 2 includes a dimensionally stable pull-out profile 3 on a face end region that is in front in the winding off direction, which profile is guided for longitudinal displacement in the vertical direction of the side window on opposite face end regions by means of drive and sliding elements in lateral guiding rails 4. The lateral guiding rails 4 are fixed on the door side and, thus, on the vehicle side, and flank the side window to be shaded on opposite sides.

The winding shaft, on which the shading structure 2 is held for winding up and off, is rotatably mounted in a door-fixed and, thus, vehicle-fixed chamber 5, which chamber is disposed between a bodywork planking of the side door and a door interior lining, wherein the side door including its bodywork planking and its door interior lining are not illustrated for the sake of clarity. Furthermore fixed to the door is a drive system 6, 7 in order to displace the pull-out profile 3 together with the shading structure 2 between the shading position according to FIG. 1 and a rest position retracted in the chamber 5 and wound up on the winding shaft. The drive system 6, 7 is integrated in the side door below a door side belt line between a bodywork structure of the side door and the door interior lining. The drive system 7 includes an electric drive unit to cause a displacement move of the pull-out profile 3 via string-type drive transmission means 6, in particular in the form of flex shafts. The drive transmission means 6 extend through the lateral guiding rails 4 up to corresponding drive elements of the pull-out profile 3 guided in the lateral guiding rails 4. The drive system 6, 7 is configured such that the opposed drive elements of the pull-out profile 3 are displaced synchronously lengthwise of the guiding rails 4, in order to effect a desired parallel displacing of the pull-out profile 3 in the vertical direction.

In the region of the door side belt line a passage is provided, in a manner not illustrated in more detail, and disposed above the chamber 5, and through said passage are led the shading structure 2 and the pull-out profile 3 during a return move from the shading position to the rest position and during a deployment move from the rest position to the shading position, respectively. The passage extends along its length over at least almost the entire width of the side window—as seen in the longitudinal direction of the vehicle.

In order to close the passage in the door side belt line, a cover 8 designed as a flap is provided and mounted for pivoting about a pivot axis D extending essentially along the vehicle longitudinal direction (FIGS. 6a to 6d) on door-fixed structural components, like in particular in the region of the lateral guiding rails 4. With reference to FIGS. 2 to 7b, the pivoting move of the cover 8 between its closed position and its open position will be described in more detail below.

The cover 8 is reinforced in the vehicle longitudinal direction, i.e. lengthwise of the passage, in a manner not illustrated in more detail. In the region of the pivot mounting of the cover 8 leg springs 17 are provided, coaxial in relation to the pivot axis D on opposite sides of the cover 8, as illustrated schematically in the FIGS. 6a to 6d, and exert permanent torque on the cover 8 towards the opening direction.

For pivoting the cover 8 between its open position (FIGS. 5 and 6d) and its closed position (FIGS. 2 and 6a) a control plunger 12 is provided on one side of the cover 8—in a left-hand side flank region with reference to the illustration in FIGS. 2 to 5—wherein the upper face end region of the plunger engages on the cover 8 on a point of application 16 at a radial distance to the pivot axis D.

The pivot mounting of the cover 8 is provided on a wall of the chamber 5, in the exemplary embodiment as illustrated. The chamber 5 is disposed—as already discussed above—fixed to the door and, thus, fixed to the vehicle in the region of a door structure, concealed by the door interior lining.

An opposite face end region of the control plunger 12 is retained on a guiding element 9 which is mounted for sliding movement in the vertical direction in a lateral guiding, in the present case a guiding slot F in the region of the left-hand lateral guiding rail 4. The guiding slot F has a limited length along the lateral guiding rail 4, which length is sufficient to transfer via a corresponding sliding movement of the guiding element 9 a corresponding opening and closing movement of the cover 8 to the control plunger 12. The guiding element 9 comprises a sliding block guided for longitudinal shifting in a guiding groove (not illustrated in more detail) of the lateral guiding rail 4 behind the guiding slot F. The guiding element 9 designed that way protrudes into a trajectory of a drive element 18 which in the region of the left-hand lateral guiding rail 4 is arranged to displace the pull-out profile 3 lengthwise of the guiding rail 4 between its rest position and its shading position. In the illustration according to FIG. 1, the left-hand flex shaft 6, guided by a corresponding guiding channel in the left-hand lateral guiding rail 4, engages on the drive element 18.

Furthermore, a permanent tensional force of a pre-tensioned tension spring 10 acts on the guiding element 9, the upper face end region of the tension spring being hooked stationarily, i.e. fixed to the vehicle, on a door-fixed holder 11. The lower face end region of the tension spring 10 engages on the guiding element 9 and exerts a permanent tensional force on the guiding element 9 in the direction towards an upper face end of the guiding slot F. As a result, the guiding element 9 is shiftable between a lower face end and the upper face end of the guiding slot F by the tensional force applied.

A plain spiral tension spring 13 engages on a side flank region of the cover 8 opposite the control plunger 12, said spring is likewise held on a guiding element 9 embodied mirror-symmetrical in relation to the left-hand guiding element 9, which is displaceable in a right-hand guiding slot F designed in analogy thereto. With reference to FIGS. 2 to 5, the right-hand guiding element 9 also has force applied to, in an analogous manner, by the synchronously displaced right-hand drive element 18 of the right-hand flex shaft 6 in the right-hand lateral guiding rail 4, once the pull-out profile 3 has approached the vicinity of its rest position.

Figure 7B:
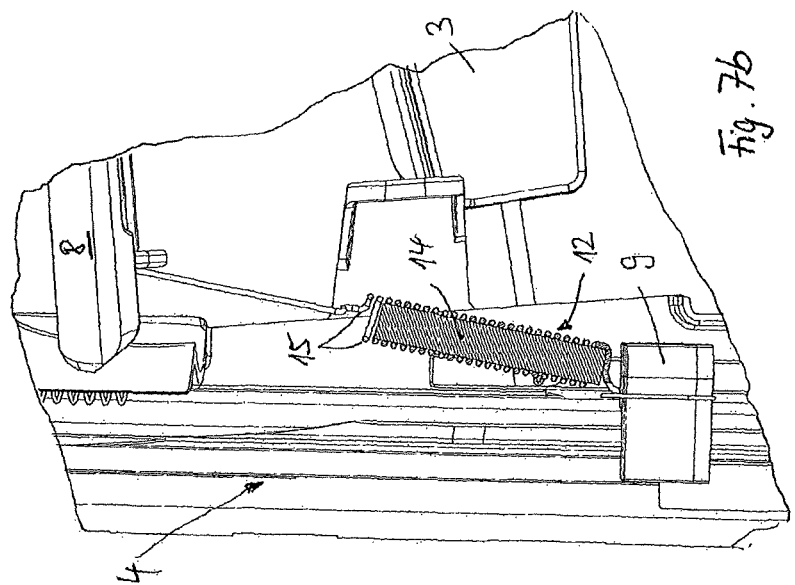
FIGS. 7a and 7b show a schematic section of the shading structure according to FIG. 1 in the region of a control plunger, which supports the cover in the open end position (FIG. 7a) and in the closed end position (FIG. 7b).
Figure 7A:
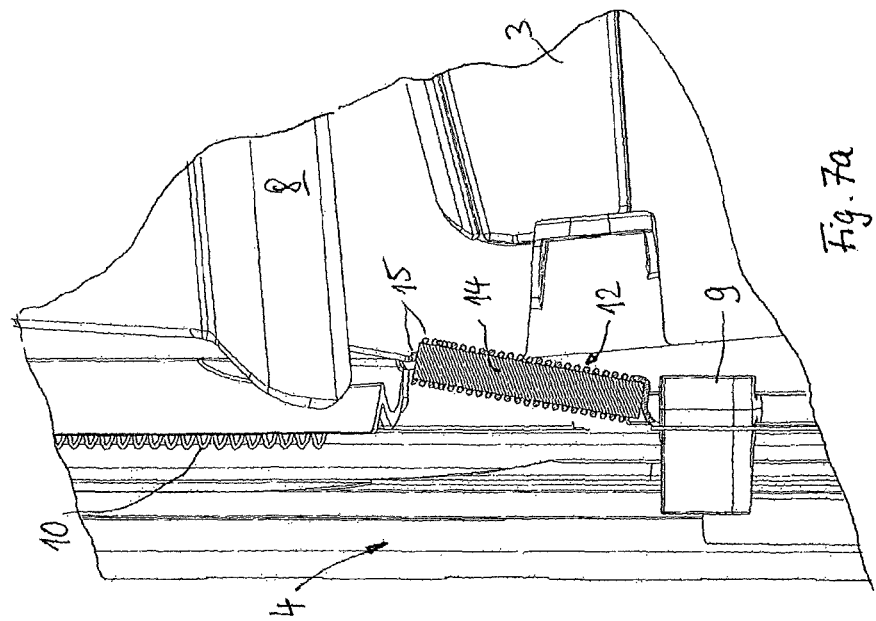

The control plunger 12 includes a spiral tension spring, with the spring windings thereof encasing a cylindrical supporting body 14 in a force-fitting manner (cf. FIGS. 7a and 7b). A spring wire of the spiral tension spring forms connecting portions on opposite face ends thereof in order to connect the spiral tension spring at the bottom with the guiding element 9 and at the top with the point of application 16 on the cover 8. The one to two spring windings 15 adjoining the upper connecting portion of the spiral tension spring are designed with a slightly greater interior diameter than the spring windings adjoining below, which are held in a force-fitting manner on the envelope of the supporting body 14. As a result, said one to two spring windings 15 allow a spring-elastic tension effect downwards in the pull direction of the control plunger 12, acting on the cover 8. The elastic tension effect by the one to two spring windings 15 of the control plunger 12 is caused when the control plunger 12 is moved via the guiding element 9 towards a lower end position, wherein the cover 8 is entrained towards the direction of the closed position. In the opposite push direction upwards, the one to two spring windings 15 are compressed to block against the adjacent spring windings of the spiral tension spring which are held in a force-fitting manner on the envelope of the supporting body 14. As a result, in said push direction upwards the control plunger 12 acts exclusively as a plunger rod. The spring windings 15 are inactivated in said push direction. The connecting portions of the spiral tension spring, producing the articulation of the control plunger 12 on the cover 8 on the one hand side and on the guiding element 9 on the other hand side, are designed with such rigidity that with corresponding tensile or compressive loads there is no deflecting or buckling of said connecting portions occurring. With reference to FIGS. 2 to 5 and 6a to 6d, said functionality of controlling the cover 8 between the open position and the closed position is readily apparent.

When the pull-out profile 3 is in its shading position, according to FIG. 1, the cover 8 is permanently held in its open position. This effect is caused by the tension spring 10 pulling the guiding element 9 towards the upper end position of the guiding slot F. The cover 8 is transferred to the open position via the control plunger 12 and retained stable in said open position.

Upon moving the pull-out profile 3 from the shading position in the direction towards the rest position downwards, the opposite drive elements 18 of the pull-out profile 3 come to abut on the guiding elements 9 located in their upper end position. The corresponding drive movement of the flex shaft causes further movement of the drive elements 18 in the lateral guiding rails 4 downwards, whereby the guiding elements 9 are forcedly entrained downwards in the guiding slots F. Thereby, the tensional forces of the control plunger 12 act on the left hand side of the cover 8 (corresponding to FIGS. 2 to 5 and 7a, 7b), while the plunger is moved downwards together with the guiding element 9. On the right hand side are acting the tensional forces of the spiral tension spring 13 which is pulled downwards together with the opposite guiding element 9. The pivot movement of the cover 8 is synchronized with the lowering move of the pull-out profile 3 in such a manner that the cover 8 is closed not earlier than after the pull-out profile 3 has passed the passage into the chamber 5 downwards. Once the cover 8 has reached its closed position, it rests on a rim of the passage of the chamber 5. Any further pivot movement of the cover 8 is blocked thereby. However, the guiding elements 9 have not yet reached their lower end position, but move further downwards over a short sliding distance. Thereby, the one to two spring windings 15 are tensioned such that the control plunger 12 exerts an elastic tensional force on the cover 8 in the pulling direction downwards, in addition to its function as a plunger rod.

During an inverse opening procedure from the rest position of the pull-out profile 3, in the sequence according to FIGS. 6a to 6d, initially the guiding element 9 is displaced over a short distance upwards by a minor upwards movement of the pull-out profile 3, whereby the one to two spring windings 15 are relaxed and do no longer exert a tensional force. Subsequently, the control plunger 12 is acting as a simple plunger rod in that it gradually opens the cover 8 during a further upwards movement of the guiding elements 9 together with the drive elements 18 and the pull-out profile 3. With reference to FIG. 6d, the opened end position, i.e. the open position, of the cover 8 is reached, wherein the passage is exposed far enough that the pull-out profile 3 is free to move upwards. The cover 8 remains in said open position owing to the permanent tensional force exertion of the tension spring 10 on the guiding element 9 until the pull-out profile 3 together with the shading structure 2 is lowered back down in the direction towards the rest position. The then starting closing procedure of the cover 8 has already been described above.

The invention claimed is:

1. A shading device for a window of an automotive vehicle, comprising a shading structure which is displaceable in vehicle-fixed lateral guiding rails between a lowered rest position and a deployed shading position using a drive, the shading structure in the rest position being lowered down in a vehicle-fixed chamber through a passage, the passage being closable by a cover which is movable between an open position and a closed position, the shading device further including a control arrangement for opening and closing the cover and being coupled to a displacement move of the shading structure, the control arrangement comprising a control plunger engaging on the cover, which control plunger is articulated to the cover in opposed pull and push directions, the control plunger being in operative connection with the cover via a spiral tension spring which is spring-elastically tensioned in one movement direction and inactively relaxed in an opposite movement direction, the spiral tension spring including at least one terminal spring winding acting as a tensioning member in the pull direction, all spring windings of the spiral tension spring being compressed to block in the push direction, the spiral tension spring being flanked on an exterior side or on an interior side by a supporting body to clamp the spring windings in a force-fitting manner.

2. The shading device according to claim 1, wherein the spiral tension spring exhibits a spring rigidity great enough in order to exert a rigid plunger function on the cover in the push direction.

3. The shading device according to claim 1, wherein the supporting body is in the form of a cylindrical packing provided on the interior side.

4. The shading device according to claim 1, wherein the control plunger is articulated on a guiding element movable along one of the lateral guiding rails opposite to a point of application of the control plunger on the cover, which guiding element is in operative connection with the shading structure over a limited traveling distance.

5. The shading device according to claim 4, wherein the guiding element protrudes into a trajectory of a drive element of a dimensionally stable pull-out profile of the shading structure.

6. A shading device for a window of an automotive vehicle, comprising a shading structure which is displaceable in vehicle-fixed lateral guiding rails between a lowered rest position and a deployed shading position using a drive, the shading structure in the rest position being lowered down in a vehicle-fixed chamber through a passage, the passage being closable by a cover which is movable between an open position and a closed position, the shading device further including a control arrangement for opening and closing the cover and being coupled to a displacement move of the shading structure, the control arrangement comprising a control plunger engaging on the cover, which control plunger is articulated to the cover in opposed pull and push directions, the control plunger being in operative connection with the cover via a spring-elastic tensioning arrangement which is spring-elastically tensioned in one movement direction and inactively relaxed in an opposite movement direction, the control plunger engaging on one side of the cover, and an elastically tensionable pulling member engaging on an opposite side of the cover, said pulling member acting on the cover only in the pull direction.

7. The shading device according to claim 6, wherein the control plunger is articulated on a guiding element movable along one of the lateral guiding rails opposite to a point of application of the control plunger on the cover, which guiding element is in operative connection with the shading structure over a limited traveling distance.

8. The shading device according to claim 7, wherein the guiding element protrudes into a trajectory of a drive element of a dimensionally stable pull-out profile of the shading structure.

* * * * *